United States Patent Office 3,741,933
Patented June 26, 1973

3,741,933
POLYCARBAMOYLAMIDRAZONES AND THEIR PRODUCTION FROM BISAMIDRAZONES AND DIISOCYANATES
Dieter Frank, Elsenfeld, Walter Brodowski, Amorbach, and Peter Hentschel, Kleinheubach, Germany, assignors to Glanzstoff AG, Wuppertal-Elberfeld, Germany
No Drawing. Filed Dec. 15, 1971, Ser. No. 208,470
Claims priority, application Germany, Dec. 16, 1970,
P 20 61 895.5
Int. Cl. C08g 22/02, 33/10
U.S. Cl. 260—47 CB                    18 Claims

ABSTRACT OF THE DISCLOSURE

Polycarbamoylamidrazones and their production by reaction of bisamidrazones and diisocyanates as monomers in an organic solvent medium at temperatures of about 0° C. to 100° C. The resulting high molecular weight polymer can be molded into useful articles and especially made into transparent films.

---

This invention is directed to a previously unknown class of linear polymers which are identified herein as "polycarbamoylamidrazones" and to a process for their production as well as their use in specific applications.

In accordance with the invention, it has now been found that one can readily obtain polycarbamoylamidrazones having recurring units of the formula

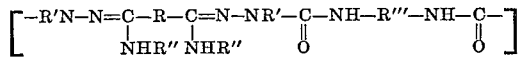

by reacting in an organic solvent medium while mixing and at a temperature of about 0° C. to 100° C. at least one bisamidrazone of the formula

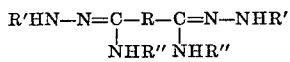

with at least one diisocyanate of the formula

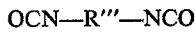

and then separating the resulting polymer reaction product from the solvent medium, e.g. by precipitation in water followed by filtration. In the above formulae, R is a single linkage between the two carbon atoms as exemplified by oxalic acid bisamidrazone or R may also be alkylene of 3 to 10 carbon atoms or an aromatic radical, especially phenyl as exemplified by iso- or terephthalic acid bisamidrazone. R' represents hydrogen or methyl; R" represents hydrogen or phenyl, i.e. so as to provide amidrazones which may or may not be substituted in the 1,1' or 3,3' positions, respectively. R''' represents the divalent organic radical of the initial diisocyanate monomer having an essentially hydrocarbon structure of 2 up to about 14 carbon atoms. Thus, R''' can be a straight or branched chain saturated aliphatic radical of preferably 2 to 12 carbon atoms, e.g. various alkylenes and methyl or ethyl substituted alkylenes. R''' may further represent cycloaliphatic especially cyclohexyl or aliphatic/cycloaliphatic such as methylcyclohexyl. R''' can also be an aromatic, araliphatic or aromatic ether radical such as phenyl, diphenyl, naphthyl, diphenyl methane, diphenyl ether or the like. In requiring essentially hydrocarbon structures in all of these organic radicals, the isolated presence of an oxygen ether atom or the like has no significant effect on the generally hydrocarbon structure.

Suitable bisamidrazones for purposes of this invention include, for example: oxalic acid bisamidrazone; adipic acid bisamidrazone; sebacic acid bisamidrazone; terephthalic acid bisamidrazone; isophthalic acid bisamidrazone; $N^1,N^{1'}$-dimethyloxalic acid bisamidrazone; and $N^3,N^{3'}$-diphenyl-oxalic acid bisamidrazone.

Examples of suitable diisocyanates include the following compounds:

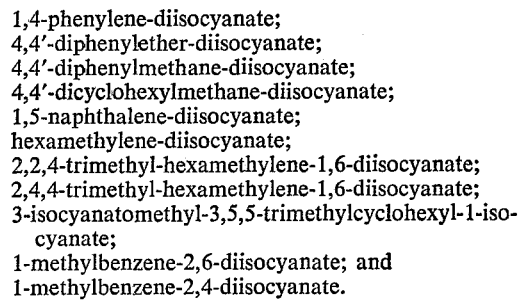

The polycarbamoylamidrazones obtained according to the invention from these two different monomers, i.e. the bisamidrazone and the diisocyanate, can be processed into fibers and especially into films with good tenacity or tensile strength properties. As prepared by the working examples below, the following polycarbamoylamidrazones possess especially good properties:

Poly-(dicyclohexylmethane-4,4'-dicarbamoyl-oxalic acid bisamidrazone);
Poly-(diphenylmethane-4,4'-dicarbamoyl-oxalic acid bisamidrazone);
Poly-(diphenylether-4,4'-dicarbamoyl-oxalic acid bisamidrazone);
Poly-(dicyclohexylmethane-4,4'-dicarbamoyl isophthalic acid bisamidrazone);
Poly-(1-methylbenzene-2,6- or -2,4-dicarbamoyl-oxalic acid bisamidrazone);
Poly-(2,2,4- or 2,4,4-trimethylhexamethylene-1,6-dicarbamoyl-isophthalic acid bisamidrazone);
Poly-(dicyclohexylmethane-4,4'-dicarbamoyl-$N^3,N^{3'}$-diphenyloxalic acid bisamidrazone);
Poly-(dicyclohexylmethane-4,4'-dicarbamoyl-adipic acid bisamidrazone);
Poly-(3-carbamoylmethyl-3,5,5-trimethylcyclohexylcarbamoyl-oxalic acid bisamidrazone); and
Poly-(dicyclohexylmethane-4,4'-dicarbamoyl-$N^1,N^{1'}$-dimethyloxalic acid bisamidrazone).

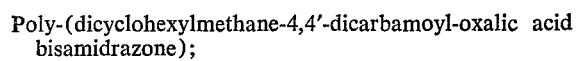

It will be noted that the reaction according to the invention is in the nature of an addition polymerization rather than a polycondensation since no compound must be withdrawn or separately bound to complete the reaction. The polymerization of the two monomers into the linear polycarbamoylamidrazone can be carried out according to the so-called interfacial process as well as the solution process. However, it has proven to be especially advantageous to work according to the solution process.

Thus, one preferably reacts together at least one bisamidrazone with at least one diisocyanate of the designated formulae in an organic solvent while mixing thoroughly and leading off the heat of reaction and thereafter isolating the reaction product.

As solvent it is possible to employ one or more conventional organic solvents in the polymerization, i.e. those solvents which are substantially inert under the reaction conditions and which are capable of dissolving one or both of the monomers. Especially suitable solvents include the following: dimethylacetamide; dimethylformamide; dimethylsulfoxide; N-methylpyrrolidone; and hexamethylphosphoric acid triamide. The solvent or solvent mixture should be as dry as possible, e.g. with a water content which does not exceed a value of approximately 0.02% by weight. In using mixtures of solvent, it is preferable to employ miscible solvents so as to achieve a polymerization in solution.

It has been found especially advantageous to conduct the polymerization reaction in the presence of lithium chloride as an agent which improves dissolution. This particular salt has the effect of increasing the solubility of the bisamidrazone monomer in the reaction medium and also causes a dissolution of the corresponding polymer in the reaction medium with the result that the initial polymer remains suspended or finely distributed in the reaction medium to achieve a longer chain length as addition proceeds with the bisamidrazone and diisocyanate portions of the recurring polymer units. The polycarbamoylamidrazones produced in this manner are of substantially higher molecular weight and therefore more desirable than those produced without the use of the solubility-improving or chain-lengthening agent.

It has also been determined that the polymer molecular weight which can be attained with the process of the invention is specifically dependent upon the molar ratio of the lithium chloride to the bisamidrazone. The best results have been obtained by using a molar ratio of lithium chloride to the bisamidrazone of about 2:1 to 7:1, preferably close to or approximately 4:1.

The polycarbamoylamidrazones exhibit a variable tendency toward gelling or coagulating in their formation. For this formation of a gel, one should calculate the amount of the solvent so as to avoid unnecessary problems or difficulties in working up the reaction mixture for separation of the polymer. It has been found that reaction mixtures containing about 5 to 11% by weight of the polycarbamoylamidrazone are well filtered i.e. in order for spinning it. The amount of solvent is preferably adjusted such that the final reaction mixture contains about 6 to 8% by weight of the polymer reaction product.

The polymerization can be carried out over a relatively wide temperature range of about 0° C. to 100° C., preferably about 15° C. to 50° C. Since the reaction is exothermic, it is desirable to cool the reaction mixture, e.g. preferably by any suitable indirect cooling means to lead off the heat of reaction.

In general, the two monomers are reacted in about equimolar amounts. However, one monomer can also be introduced or provided in a slight molar excess over the other monomeric component. It is preferable to slowly add one monomer to the other while rapidly mixing or stirring so as to more carefully control the reaction in a single stage or batch polymerization. However, other conventional addition polymerization procedures may also be followed.

Depending upon the particular polymerization conditions, the polycarbamoylamidrazones of the invention possess different molecular weights. By using a single organic solvent medium such as dimethylformamide containing lithium chloride, polymers can be obtained with an inherent viscosity in the range of $\eta_{inh.} = 0.3$ to 3.1. By comparison, the products produced by using an interfacial addition polymerization exhibit markedly lower viscosities.

The new polycarbamoylamidrazones of the invention are amorphous, colorless polymers which do not have a setting point (second order transition temperature) or any crystalline melting point. They decompose at temperatures on the order of about 240° C. The initially coagulated or precipitated polymers are no longer soluble in the usual organic solvents or in aqueous alkali solvents. In concentrated sulfuric acid, the polymers are strongly degraded or decomposed. They are dissolved without decomposition in a lithium chloride-containing dimethylformamide solvent and in formic acid, and these solutions of the polymer can be used to produce shaped or molded articles. Films produced from such polycarbamoylamidrazone solutions are transparently clear, flexible and relatively strong, exhibiting a tensile strength of from 7 to 22 kilograms/mm.$^2$ at from 3 to 13% elongation.

The folowing examples further illustrate the invention:

EXAMPLES 1 TO 14

The polymerization is carried out in a reaction vessel equipped with a stirring apparatus and a thermometer as well as means for introducing and removing nitrogen as an inert atmosphere. Cooling means are also provided to control the temperature. In the accompanying table are listed the monomeric reaction components and solvents employed in each instance. In Example 14, the temperature of the reaction amounted to 50° C. while all other examples were carried out consistently at 20° C.

Four-fifths of the given amount of solvent was used to dissolve the stated amount of the bisamidrazone given in the table together with lithium chloride in a molar ratio of this chloride to the bisamidrazone of 4:1. This dissolution took place at 30–90° C. while stirring under a nitrogen atmosphere. The given amount of diisocyanate was dissolved in the remaining one-fifth of the solvent and added slowly dropwise with stirring into the bisamidrazone solution. After bringing together all of the reaction components, the mixture was stirred for an additional two hours at the reaction temperature.

Thereafter the polymer was precipitated by gradually dropping the viscous reaction solution with centrifuging into a large excess of water, if necessary after first thinning the initial reaction solution with some additional solvent. The powdery polymer was filtered off by suction, washed several times with water, finally washed with methanol and then dried at 60° C. under a vacuum.

The yield in all cases was practically quantitative. The obtained values of viscosity, as set forth in the table, were measured on 0.5 gram of polymer dissolved in 100 ml. of dimethylformamide as the solvent containing 5% by weight LiCl at 20° C., using an Ubbelohde viscosimeter.

The following abbreviations are used in the accompanying table:

To identify the bisamidrazone:
    OAB=Oxalic acid bisamidrazone
    IPAB=Isophthalic acid bisamidrazone
    AAB=Adipic acid bisamidrazone
    DPOAB=$N^3,N^{3'}$-diphenyloxalic acid bisamidrazone
    DMOAB=$N^1,N^{1'}$-dimethyloxalic acid bisamidrazone To identify the diisocyanates:
    DCMDI=Dicyclohexylmethane-4,4'-diisocyanate
    MDI=Diphenylmethane-4,4'-diisocyanate
    DPEDI=Diphenylether-4,4'-diisocyanate
    TMDI=2,2,4- and 2,4,4-trimethylhexamethylene-diisocyanate isomeric mixture
    IPDI=3-isocyanatomethyl - 3,5,5 - trimethylcyclohexyl-isocyanate
    TDI=1-methylbenzene-2,6- and -2,4-diisocyanate isomeric mixture To identify the solvents:
    DMA=Dimethylacetamide
    DMF=Dimethylformamide
    DMSO=Dimethylsulfoxide
    NMP=N-methylpyrrolidone

TABLE

| Ex. No. | Monomeric components | | Added amounts | | Solvent | | Polymer content (percent) | Viscosity, $\eta_{inh}$ |
|---|---|---|---|---|---|---|---|---|
| | Bisamidrazone | Diisocyanate | Bisamidrazone | Diisocyanate | Type | Amount, g. | | |
| 1 | OAB | DCMDI | 11.61 g. (0.1 mol) | 26.24 g. (0.1 mol) | DMF | 575 | 6 | 0.99 |
| 2 | OAB | MDI | 11.61 g. (0.1 mol) | 25.03 g. (0.1 mol) | DMF | 558 | 6 | 1.03 |
| 3 | OAB | DPEDI | 11.61 g. (0.1 mol) | 25.22 g. (0.1 mol) | DMF | 560 | 6 | 0.34 |
| 4 | OAB | TMDI | 11.61 g. (0.1 mol) | 21.03 g. (0.1 mol) | DMF | 495 | 6 | 0.38 |
| 5 | OAB | IPDI | 11.61 g. (0.1 mol) | 22.23 g. (0.1 mol) | DMF | 514 | 6 | 1.14 |
| 6 | OAB | TDI | 11.61 g. (0.1 mol) | 17.42 g. (0.1 mol) | DMF | 438 | 6 | 0.79 |
| 7 | OAB | DCMDI | 2.90 g. (25 mmol) | 6.56 g. (25 mmol) | DMA | 143 | 6 | 0.74 |
| 8 | OAB | DCMDI | 2.90 g. (25 mmol) | 6.56 g. (25 mmol) | DMSO | 143 | 6 | 0.58 |
| 9 | OAB | DCMDI | 2.90 g. (25 mmol) | 6.56 g. (25 mmol) | NMP | 143 | 6 | 0.73 |
| 10 | IPAB | DCMDI | 12.56 g. (66 mmol) | 17.5 g. (66 mmol) | DMF | 480 | 6 | 2.27 |
| 11 | IPAB | TMDI | 9.61 g. (50 mmol) | 10.5 g. (50 mmol) | DMF | 315 | 6 | 3.08 |
| 12 | DPOAB | DCMDI | 5.36 g. (20 mmol) | 5.24 g. (20 mmol) | DMF | 198 | 5 | 0.82 |
| 13 | AAB | DCMDI | 8.51 g. (50 mmol) | 13.2 g. (50 mmol) | DMF | 368 | 6 | ---- |
| 14 | DMOAB | DCMDI | 2.88 g. (20 mmol) | 5.29 g. (20 mmol) | DMF | 152 | 5 | 0.80 |

The invention is hereby claimed as follows:

1. A film forming polycarbamoylamidrazone composed of recurring units of the formula

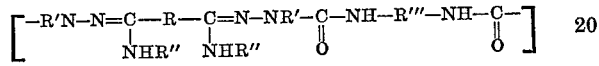

wherein:
R is a direct chemical bond, alkylene of 3 to 10 carbon atoms or aryl
R' represents hydrogen or methyl; R'' represents hydrogen or phenyl
R''' is a divalent organic radical having an essentially hydrocarbon structure of 2 up to about 14 carbon atoms.

2. The film forming poly-(dicyclohexylmethane-4,4'-dicarbanoyl-oxalic acid bisamidrazone).

3. The film forming poly-(diphenylmethane-4,4'-dicarbamoyl-oxalic acid bisamidrazone).

4. The film forming poly-(diphenylether-4,4'-dicarbamoyl-oxalic acid bisamidrazone).

5. The film forming poly-(dicyclohexylmethane-4,4'-dicarbamoyl-isophthalic acid bisamidrazone).

6. The film forming poly-(trimethylhexamethylene-1,6-dicarbamoyl-isophthalic acid bisamidrazone).

7. The film forming poly-(3-carbamoylmethyl-3,5,5-trimethyl-cyclohexylcarbamoyl-oxalic acid bisamidrazone).

8. The film forming poly-(1-methylbenzene-2,6- or -2,4-dicarbamoyloxalic acid bisamidrazone).

9. The film forming poly-(dicyclohexylmethane-4,4'-dicarbamoyl-$N^3$,$N^{3\prime}$-diphenyl-oxalic acid bisamidrazone).

10. The film forming poly-(dicyclohexylmethane-4,4'-dicarbamoyl-$N^1$,$N^{1\prime}$-dimethyl-oxalic acid bisamidrazone).

11. The film forming poly-(dicyclohexylmethane-4,4'-dicarbamoyl-adipic acid bisamidrazone).

12. A process for the production of a film forming polycarbamoyl-amidrazone having recurring units of the formula

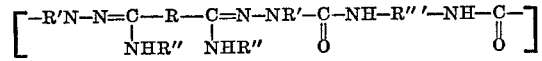

wherein
R is a direct chemical bond, alkylene of 3 to 10 carbon atoms or aryl
R' represents hydrogen or methyl, R'' represent hydrogen or phenyl and
R''' is a divalent organic radical having an essentially hydrocarbon structure of 2 up to about 14 carbon atoms, which process comprises:
reacting in an organic solvent medium while mixing and at temperature of about 0° C. to 100° C. at least one bisamidrazone of the formula

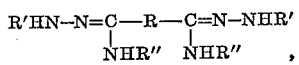

wherein R, R' and R'' have the same meanings as set forth above, with at least one diisocyanate of the formula

wherein R''' has the same meaning as set forth above; and separating the resulting film forming polymer reaction product.

13. A process as claimed in claim 12 wherein the reaction temperature is maintained at about 15° C. to 50° C.

14. A process as claimed in claim 12 wherein said organic solvent medium is at least one compound selected from the group consisting of dimethylacetamide, dimethylformamide, N-methylpyrrolidone and dimethylsulfoxide.

15. A process as claimed in claim 12 wherein said reaction is carried out in the presence of lithium chloride.

16. A process as claimed in claim 15 wherein the molar ratio of lithium chloride to the bisamidrazone is from about 2:1 to 7:1.

17. A process as claimed in claim 16 wherein said molar ratio of lithium chloride to the bisamidrazone is approximately 4:1.

18. A process as claimed in claim 12 wherein the amount of solvent is chosen such that the polymer reaction product constitutes about 6 to 8 percent by weight of the final reaction mixture.

References Cited

UNITED STATES PATENTS

| | | | |
|---|---|---|---|
| 3,544,528 | 12/1970 | Magerlein et al. | 260—78 |
| 3,560,452 | 2/1971 | Schulze et al. | 260—78 |
| 3,560,453 | 2/1971 | Schopfetal | 260—78 |
| 3,583,953 | 6/1971 | Rupp et al. | 260—78 X |
| 3,661,836 | 5/1972 | Schopf et al. | 260—78 X |

OTHER REFERENCES

J. of Polymer Science (Polymer letters), part B, vol. 4, pp. 869–873, Saga et al., 1966.

HOWARD E. SCHAIN, Primary Examiner

U.S. Cl. X.R.

260—31.2 N, 32.6 N, 77.5 R, 77.5 AM, 78 TF